US011582392B2

(12) United States Patent
Karri et al.

(10) Patent No.: US 11,582,392 B2
(45) Date of Patent: Feb. 14, 2023

(54) AUGMENTED-REALITY-BASED VIDEO RECORD AND PAUSE ZONE CREATION

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Akash U. Dhoot, Pune (IN); Sayyad Baji Shaik, Visakhapatnam (IN); Rajasekhar Chaganti, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 17/212,405

(22) Filed: Mar. 25, 2021

(65) Prior Publication Data
US 2022/0311948 A1    Sep. 29, 2022

(51) Int. Cl.
*H04N 5/232* (2006.01)
*G06T 19/00* (2011.01)
*G06V 20/10* (2022.01)
*G06V 20/40* (2022.01)

(52) U.S. Cl.
CPC ..... *H04N 5/232941* (2018.08); *G06T 19/006* (2013.01); *G06V 20/10* (2022.01); *G06V 20/40* (2022.01)

(58) Field of Classification Search
CPC ........ H04N 5/232945; H04M 1/72457; H04W 12/64
See application file for complete search history.

(56) References Cited

U.S. PATENT DOCUMENTS

| 8,218,015 | B2 * | 7/2012 | Wun | H04N 1/444 370/312 |
| 8,254,957 | B2 * | 8/2012 | Ferren | H04W 4/025 455/26.1 |
| 9,197,864 | B1 | 11/2015 | Starner | |
| 9,661,221 | B2 * | 5/2017 | Sadasivam | H04N 5/23216 |
| 9,866,709 | B2 * | 1/2018 | Hostyn | H04N 1/00204 |

(Continued)

FOREIGN PATENT DOCUMENTS

| CN | 106231196 A | 12/2016 |
| CN | 107395968 A | 11/2017 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — John Villecco
(74) *Attorney, Agent, or Firm* — Robert D. Bean

(57) ABSTRACT

According to one embodiment, a method, computer system, and computer program product for operating a camera to perform video capture of a subject is provided. The present invention may include pausing or recording video capture of the subject based on the camera's location within one or more designated recording zones, wherein the recording zones are two-dimensional or three-dimensional regions comprising or within view of the subject, and wherein the recording zones are designated within an augmented reality environment.

17 Claims, 6 Drawing Sheets

(56) References Cited

U.S. PATENT DOCUMENTS

| | | | |
|---|---|---|---|
| 10,033,852 B2 * | 7/2018 | Clavenna, II | H04M 1/72457 |
| 10,306,315 B2 * | 5/2019 | Bailey | G06V 20/10 |
| 10,423,241 B1 * | 9/2019 | Pham | G02B 27/017 |
| 10,447,910 B2 * | 10/2019 | Bostick | H04N 5/23225 |
| 10,521,178 B2 * | 12/2019 | Ziv | G06F 3/1423 |
| 10,587,791 B2 * | 3/2020 | Wood | H04N 5/2353 |
| 10,594,855 B2 * | 3/2020 | Rodriguez Bravo | H04W 48/04 |
| 10,701,444 B2 * | 6/2020 | Bailey | H04N 21/4542 |
| 10,762,795 B2 * | 9/2020 | Contreras | G05D 1/0033 |
| 10,803,663 B2 * | 10/2020 | Wang | G06F 3/011 |
| 10,880,495 B2 * | 12/2020 | Yao | G06V 40/172 |
| 11,024,074 B2 * | 6/2021 | Noris | G06T 19/20 |
| 11,250,606 B2 * | 2/2022 | Glaser | G06V 10/25 |
| 2009/0181716 A1 * | 7/2009 | Benco | H04N 1/4433 455/550.1 |
| 2014/0225812 A1 | 8/2014 | Hosoya | |
| 2014/0267403 A1 | 9/2014 | Maciocci | |
| 2014/0267799 A1 * | 9/2014 | Sadasivam | H04N 5/23216 348/207.99 |
| 2015/0281889 A1 * | 10/2015 | Menendez | H04W 4/021 455/456.1 |
| 2016/0100046 A1 * | 4/2016 | Meru | H04W 12/02 455/419 |
| 2016/0142626 A1 * | 5/2016 | Bostick | G06Q 50/01 348/207.11 |
| 2016/0364579 A1 * | 12/2016 | Wilmes | H04M 1/72463 |
| 2017/0034430 A1 | 2/2017 | Fu | |
| 2017/0094160 A1 * | 3/2017 | Bostick | G06F 16/9535 |
| 2017/0180676 A1 | 6/2017 | Oien | |
| 2018/0052648 A1 * | 2/2018 | Ziv | G09G 5/12 |
| 2018/0176366 A1 * | 6/2018 | Mukherjee | H04M 3/2281 |
| 2019/0043259 A1 * | 2/2019 | Wang | G06F 3/012 |
| 2020/0118380 A1 * | 4/2020 | Nelson | G07F 17/3216 |
| 2020/0137297 A1 | 4/2020 | Song | |
| 2022/0060481 A1 * | 2/2022 | Lopez Mendez | H04W 12/08 |

FOREIGN PATENT DOCUMENTS

| | | |
|---|---|---|
| CN | 111611605 A * | 9/2020 |
| KR | 20150134960 A * | 12/2015 |

\* cited by examiner

AUGMENTED-REALITY-BASED VIDEO RECORD AND PAUSE ZONE CREATION

BACKGROUND

The present invention relates, generally, to the field of computing, and more particularly to digital video capture.

Digital video capture is the process of utilizing a camera to record information describing a chronologically ordered series of images visible to the camera in digital memory. The widespread availability of portable cameras, namely integrated into smart phones, laptops, and other computing devices, have made video capturing simple and convenient, and the advent of social media has resulted in a ready-made audience for captured videos. As a result, video capture has become a ubiquitous and immensely popular activity. A technology that stands to improve the video capture process may exist in the form of augmented reality (AR); AR is a modern computing technology that uses software to generate images, sounds, haptic feedback, and other sensations to augment a real-world environment. While the creation of this augmented environment can be achieved with general-purpose computing devices, such as cell phones, more specialized equipment is also used, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable. This technology has the potential to transform countless aspects of human life, from construction to military training to space exploration, and may be applied to improve the field of digital video capture.

SUMMARY

According to one embodiment, a method, computer system, and computer program product for operating a camera to perform video capture of a subject is provided. The present invention may include pausing or recording video capture of the subject based on the camera's location within one or more designated recording zones, wherein the recording zones are two-dimensional or three-dimensional regions comprising or within view of the subject, and wherein the recording zones are designated within an augmented reality environment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
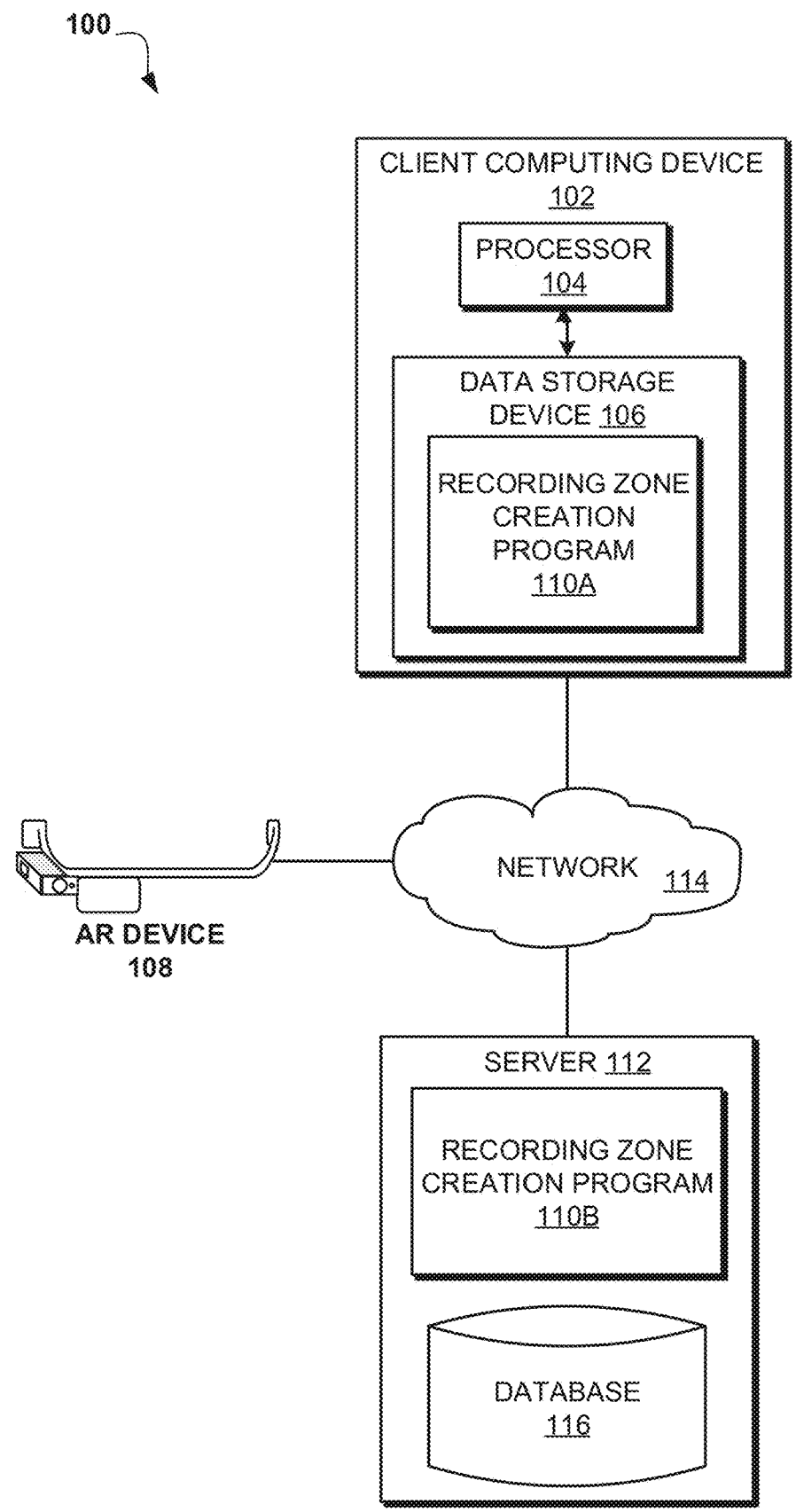
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to digital video capture. The following described exemplary embodiments provide a system, method, and program product to, among other things, automatically identify where video should be paused or recorded to capture an intended subject of a video based on recording zones, and pause or record video accordingly. Therefore, the present embodiment has the capacity to improve the technical field of digital video capture by improving the speed and precision with which recordation of a video is initiated or paused, and thereby maximizing and improving capture of the intended subject of the video, and excluding undesirable and/or irrelevant elements.

As previously described, digital video capture is the process of utilizing a camera to record information describing a chronologically ordered series of images visible to the camera in digital memory. The widespread availability of portable cameras, namely integrated into smart phones, laptops, and other computing devices, have made video capturing simple and convenient, and the advent of social media has resulted in a ready-made audience for captured videos. As a result, video capture has become a ubiquitous and immensely popular activity. A technology that stands to improve the video capture process may exist in the form of augmented reality (AR); AR is a modern computing technology that uses software to generate images, sounds, haptic feedback, and other sensations to augment a real-world environment. While the creation of this augmented environment can be achieved with general-purpose computing devices, such as cell phones, more specialized equipment is also used, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable. This technology has the potential to transform countless aspects of human life, from construction to military training to space exploration, and may be applied to improve the field of digital video capture.

Currently, users use mobile devices to capture videos of events, objects et cetera that the user wishes to record. While capturing video, there are sometimes instances where the subject of the video leaves the visual range of the camera, either as a result of the motion of the camera or the subject, or where the subject becomes out of focus or occluded, or where undesirable objects are entering the frame, et cetera. In such instances, the user must select the video recording and pausing option manually while capturing video, and resume afterwards. For a variety of reasons, there may be a delay in pausing or recording video, for instance because the user is focused on the subject of the video and not on the video being recorded on the mobile device, or because the user needs to reposition her hand to reach the button, or even merely the lag in a user's reflexes or in the mobile device's input processing; however, even a small delay may be sufficient to significantly degrade the quality of the video by, for example, capturing undesirable visual elements and/or failing to capture the intended subject of the video. As such, it may be advantageous to, among other things, implement a system that intuits when the video is to be recorded and when the video is to be paused in order to best capture the subject of a video, and automatically pauses or records video capture accordingly.

According to one embodiment, the invention is a method of cognitively determining when video is to be recorded and when video is to be paused to best capture a subject of a video.

In some embodiments, the method may be a method and system of utilizing augmented reality systems to enable one or more users to designate recording zones where the system should record or pause video recording.

The intended subject may be the main object, area, scene, event, person, creature, et cetera which the user wishes to capture in a video. Sometimes the intended subject may be the area described by the recording zones, in which case the system may not receive or designate an intended subject separate from the recording zones. The suggested subject may be an object, area, scene, event, person, creature, et cetera that the user may wish to capture in a video as automatically identified by the system rather than received from a user.

As herein described, recording zones may be two-dimensional or three-dimensional regions where the system may record video to capture the subject of a captured video; the zones may, for example, encompass the intended subject or subjects to be captured in a video, and/or describing an area within which a camera could view and therefore record the intended subject, or where the shot could be of particular high quality, for example by incorporating favorable lighting or desirable background or foreground elements. In some embodiments, for example where the intended subject is a scene, event, object, et cetera that takes up a large amount of room, the recording zone may represent the area describing the intended subject, such that the recording zone and the intended subject are the same. The recording zones may further comprise two-dimensional or three-dimensional regions where recording is to be paused; such regions may be regions that do not contain any intended subject, regions from which a camera could not view or record the intended subject, or regions from which a camera may view the intended subject but from an undesirable angle, or where the recording may be of degraded video quality, or where the recording may include undesirable elements such as in the background or foreground of the shot, et cetera. In some embodiments, for example where the intended subject is moving, the recording zones may also change position to accommodate the motion of the intended subject.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to automatically identify where video should be paused or recorded to capture an intended subject of a video based on recording zones, and pause or record video accordingly.

Referring to FIG. 1, an exemplary networked computer environment 100 is depicted, according to at least one embodiment. The networked computer environment 100 may include client computing device 102, augmented reality device 108, and a server 112 interconnected via a communication network 114. According to at least one implementation, the networked computer environment 100 may include a plurality of client computing devices 102, augmented reality devices 108, and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a recording zone creation program 110A and communicate with the server 112 and augmented reality (AR) device 108 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The augmented reality (AR) device 108 may be any device or combination of devices enabled to record real-world information that recording zone creation program 110A, 110B, or a dedicated augmented reality program or routine in communication with or integrated into recording zone creation program 110A, 110B, may overlay with computer-generated perceptual elements to create an augmented reality environment for the user. Augmented Reality (AR) Device 108 may be equipped with or comprise a number of sensors such as a camera, microphone, accelerometer, et cetera, and/or may be equipped with or comprise a number of user interface devices such as displays, touchscreens, speakers, et cetera. In some embodiments, the AR device 108 may be a headset that is worn by the viewer; in some embodiments, the client computing device 102 and AR device 118 may be combined into a single device, the client computing device 102 may be an AR device 108 or vice versa, and/or client computing device 102 and AR device 108 may comprise components of a single device.

The server computer 112 may be a laptop computer, netbook computer, personal computer (PC), a desktop computer, or any programmable electronic device or any network of programmable electronic devices capable of hosting and running a recording zone creation program 110B and a database 116 and communicating with the client computing device 102 and an augmented reality (AR) device 108 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the recording zone creation program 110A, 110B may be a program capable of automatically identify where video should be paused or recorded to capture an intended subject of a video based on recording zones, and pause or record video accordingly. The recording zone creation may be located on client computing device 102, augmented reality (AR) device 108, or server 112 or on any other device located within network 114. Furthermore, recording zone creation may be distributed in its operation over multiple devices, such as client computing device 102, AR device 108 and server 112. The recording zone creation method is explained in further detail below with respect to FIG. 2.

Figure 2:
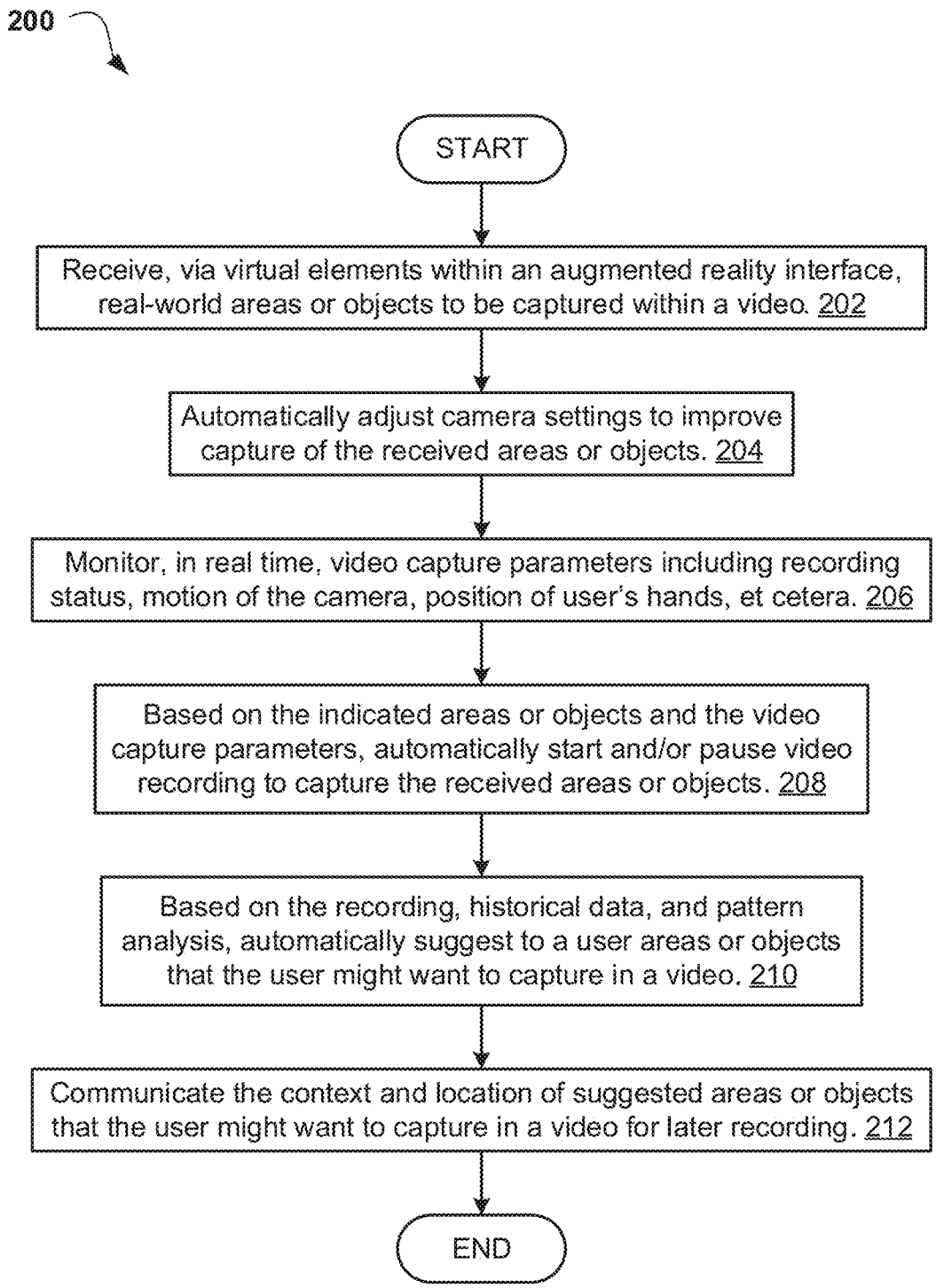
FIG. 2 is an operational flowchart illustrating a recording zone creation process according to at least one embodiment.

Referring now to FIG. 2, an operational flowchart illustrating a recording zone creation process 200 is depicted according to at least one embodiment. At 202, the recording zone creation program 110A, 110B receives, via virtual elements within an augmented reality interface, real-world areas or objects to be captured. The user may select an intended subject for capturing in a video. The user may utilize gestures or user interface devices to construct virtual boundaries within an augmented reality environment that are anchored to locations and positions in the real world, where the boundaries describe recording zones. The user may, for example, draw boundaries freeform with her hand, or size or position shapes corresponding with the desired region in the real world. The recording zone creation program 110A, 110B may receive the intended subject and/or recording zones from, for example, the user, from an augmented reality program, and/or from an augmented reality device 108. In some embodiments, such as where recording zone creation program 110A, 110B is deployed in a multi-user environment, the recording zone creation program 110A, 110B may allow multiple users to collaboratively define the video recording zones; the recording zone creation program 110A, 110B may, for example, allow users authorized by an administrator, owner user, project leader, et cetera to designate recording zones or subjects for a particular camera, a client computing device 102 or augmented reality headset 108 comprising one or more cameras, a project affiliated with the camera or an app using the camera, a family of devices defined for instance by common ownership or affiliation to a user or group of users, et cetera. The recording zone creation program 110A, 110B may receive video recording zones from each of several authorized users and may combine the zones into one, or may receive a single set of video recording zones that is collaboratively created by multiple users. In some embodiments, for example where recording zone creation program 110A, 110B predicts the recording zones based on feedback, recording zone creation program 110A, 110B may automatically designate recording zones for a received intended subject; in some embodiments, such as where recording zone creation program 110A, 110B automatically identifies intended subjects, recording zone creation program 110A, 110B may automatically designate recording zones for the automatically identified intended subject.

At 204, recording zone creation program 110A, 110B automatically adjusts camera settings to improve capture of the received areas or objects. The camera settings may include the zoom level, brightness, focus, color saturation, et cetera. The recording zone creation program 110A, 110B may choose camera settings, in real time or near-real-time, based on user preferences and/or according to pre-provided templates associated with certain focal lengths, atmospheric conditions, et cetera that might be present in the video captured by the camera. In some embodiments, recording zone creation program 110A, 110B may dynamically select the camera settings so that the camera may capture the target object or area without any manual activity or partial intervention of the user holding the camera. In some embodiments, for instance where the intended subject is moving or the camera is moving, recording zone creation program 110A, 110B may adjust camera settings to account for the motion of the intended subject and/or the camera. In some embodiments, for example where the intended subject is moving, the recording zone creation program 110A, 110B may dynamically adjust the recording zones to account for the movement of the intended subject.

At 206, recording zone creation program 110A, 110B monitors, in real time, video capture parameters including recording status, motion of the camera, position of the user's hands, distance to the ground, et cetera. Recording status may represent the state of video capture; whether it is paused, actively recording, et cetera. In some embodiments of the invention, recording zone creation program 110A, 110B may use continuous sensor feed analysis to track various user interaction behaviors with the mobile device inferred from the video capture parameters, such as when and in what contexts the user is pausing or resuming video recording, determine preferred angles at which the user aims the camera, et cetera; the recording zone creation program 110A, 110B may use pattern recognition techniques on the tracked user interaction behaviors to understand when the user wants to pause the recording, or if the recording is paused, when the user wants to resume video recording. For example, if the user's hand is positioned out of convenient reach of the video play/pause controls, recording zone creation program 110A, 110B may determine that the user wants to pause or play video recording automatically.

At 208, recording zone creation program 110A, 110B automatically starts and/or pauses video recording to capture the received areas or objects based on the indicated areas or objects and the video capture parameters. In other words, the recording zone creation program 110A, 110B may input commands to the camera to toggle the camera between recording and pause states based on the camera's location relative to the recording zones, and this process may occur automatically without requiring any input from the user or a human operator. In some embodiments, recording zone creation program 110A, 110B may utilize the sensor feed analysis and/or user preferences and/or past user behaviors or behaviors of similar users to determine, using for instance a machine learning model, the contexts where the user wants recording zone creation program 110A, 110B to pause or initiate video capture. In some embodiments, recording zone creation program 110A, 110B may dynamically start recording upon detecting that the camera has moved into a zone designated as a recording zone, and may pause video recording based on determining that the camera has moved outside of the recording zone, or has moved into a zone designated as a non-recording zone. In some embodiments, for example where the user has identified a moving object as the subject to be captured in the video, the recording zone creation program 110A, 110B may dynamically begin recording when the subject is within the visual range of the camera. In some embodiments, recording zone creation program 110A, 110B may pause video recording when the intended subject is not visible to the camera, and may resume when the intended subject once again becomes visible to the camera.

At 210, recording zone creation program 110A, 110B automatically suggests to a user areas or objects that the user might want to capture in a video. In some embodiments, recording zone creation program 110A, 110B may, based for example on subjects identified or recording zones created by a given user in the past, extract the preferences of that user with regard to boundary creation and/or subject identification, and use these preferences to automatically identify suggested subjects that the user may want to capture video of, for example within objects or areas visible to cameras associated with the user's client computing device 102 and/or augmented reality headset 108. The recording zone creation program 110A, 110B may create boundaries to capture the suggested subject in similar situations, for example by utilizing an attribute detection model to identify similarities between the images currently or recently viewed by the camera and the images attributed with past subjects or recording zones, where attributes may include lighting, rain, nature photography, et cetera. In some embodiments, for example where the user is wearing an AR headset, recording zone creation program 110A, 110B may create a notification or haptic feedback to prompt the user to indicate whether the user wishes to capture suggested subjects or recording zones in video. If the user indicates that the user wishes to capture the suggested subjects or recording zones, for instance via a gesture, audio command, or by interacting with a graphical element on a display, recording zone creation program 110A, 110B may guide the user's camera position and direction, for instance via graphical prompts or video in an augmented reality environment or display, to where the suggested subject can be recorded, such as within a recording zone. Once positioned or even prior to being positioned such that the suggested subject is visible, recording zone creation program 110A, 110B may promptly initiate video recording to avoid any delay in capturing videos and missing the suggested subject.

At 212, recording zone creation program 110A, 110B communicates the context and location of suggested areas or objects that the user might want to capture in a video for later recording. In some embodiments, for example where the user declined or failed to respond to a request to capture a received or identified subject or recording zone, recording zone creation program 110A, 110B may capture identifying information pertaining to all suggested subjects such as size, shape, images, et cetera, as well as the locations of the suggested subjects. The recording zone creation program 110A, 110B may use the identifying information and location to generate a context and specify a map location for the suggested subjects, which is presented to the user or stored in a repository accessible to a user, in case the user wants to revisit the area later and capture video of the suggested subjects.

Figure 3A:
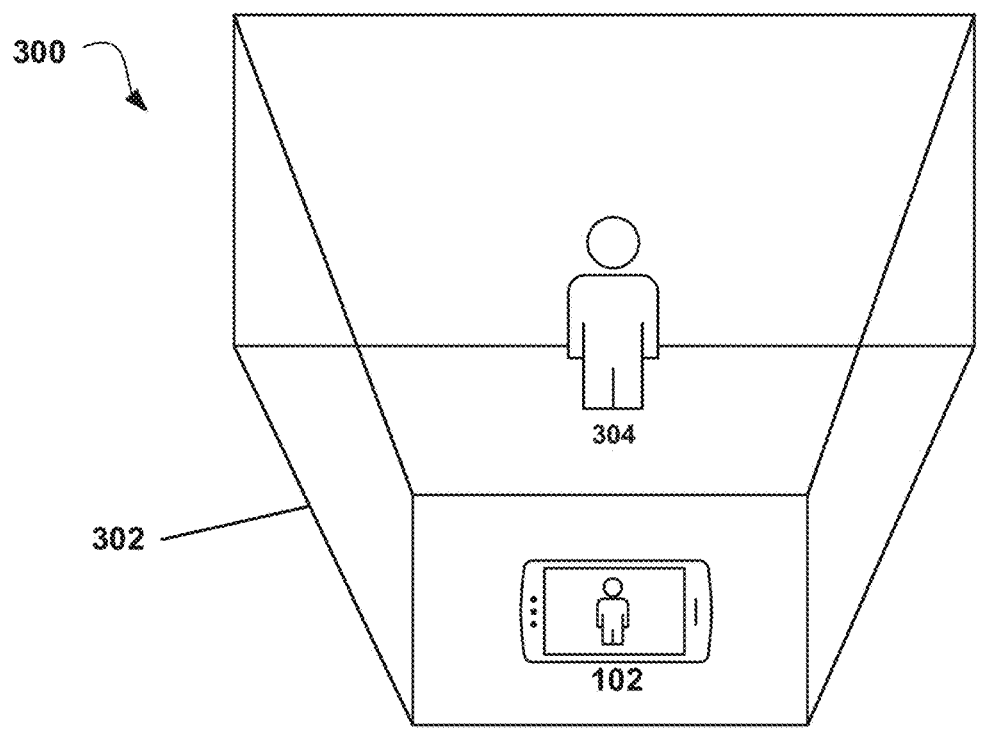
FIG. 3A illustrates an exemplary use case of a recording zone creation process and system according to at least one embodiment.

With regard to FIG. 3A, an exemplary use case 300 of a recording zone creation process and system is depicted according to at least one embodiment. Here, the user has defined a recording zone 302, which is a three-dimensional region encompassing the subject 304. The camera, here integrated with mobile device 102, is within the recording zone 302, and therefore recording zone creation program 110A, 110B has dynamically begun capturing video of subject 304.

With regard to FIG. 3A, an exemplary use case 300 of a recording zone creation process and system is depicted according to at least one embodiment. Here, the camera integrated with client computing device 102 has been moved 306 outside of recording zone 302, and can no longer see the subject 304. As a result, recording zone creation program 110A, 110B pauses recording, until the camera is moved back within recording zone 302.

Figure 3B:
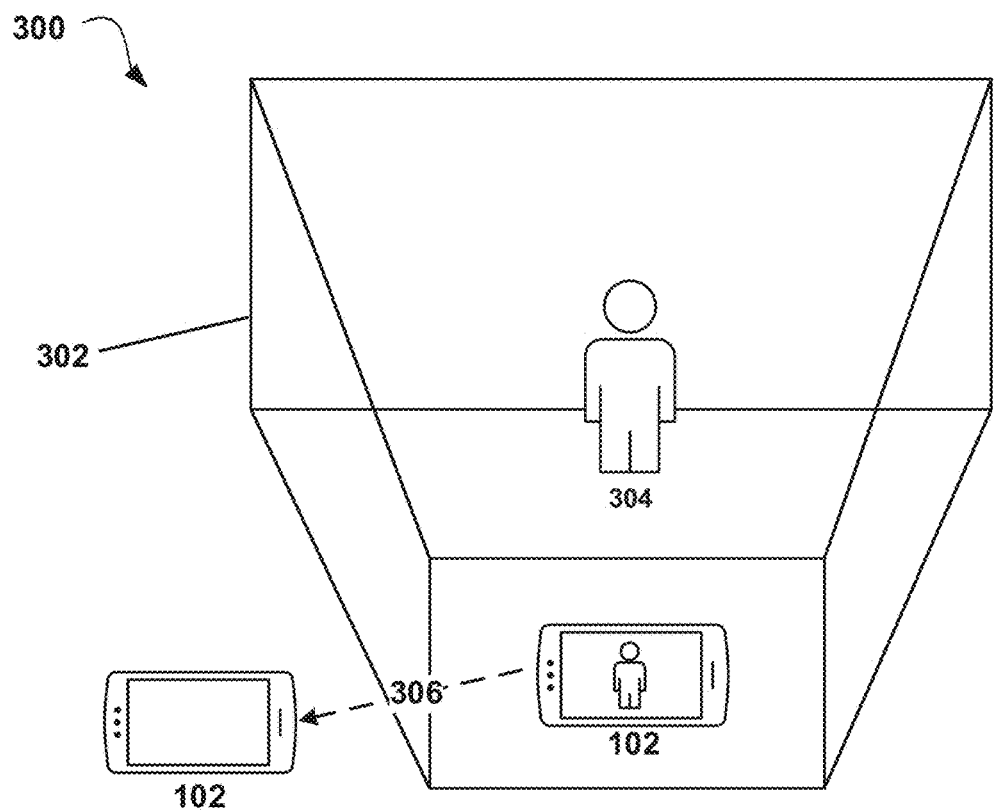
FIG. 3B illustrates an exemplary use case of a recording zone creation process and system according to at least one embodiment.

It may be appreciated that FIGS. 2-3 provide only an illustration of individual implementations and do not imply any limitations with regard to how different embodiments may be implemented. Many modifications to the depicted environments may be made based on design and implementation requirements.

Figure 4:
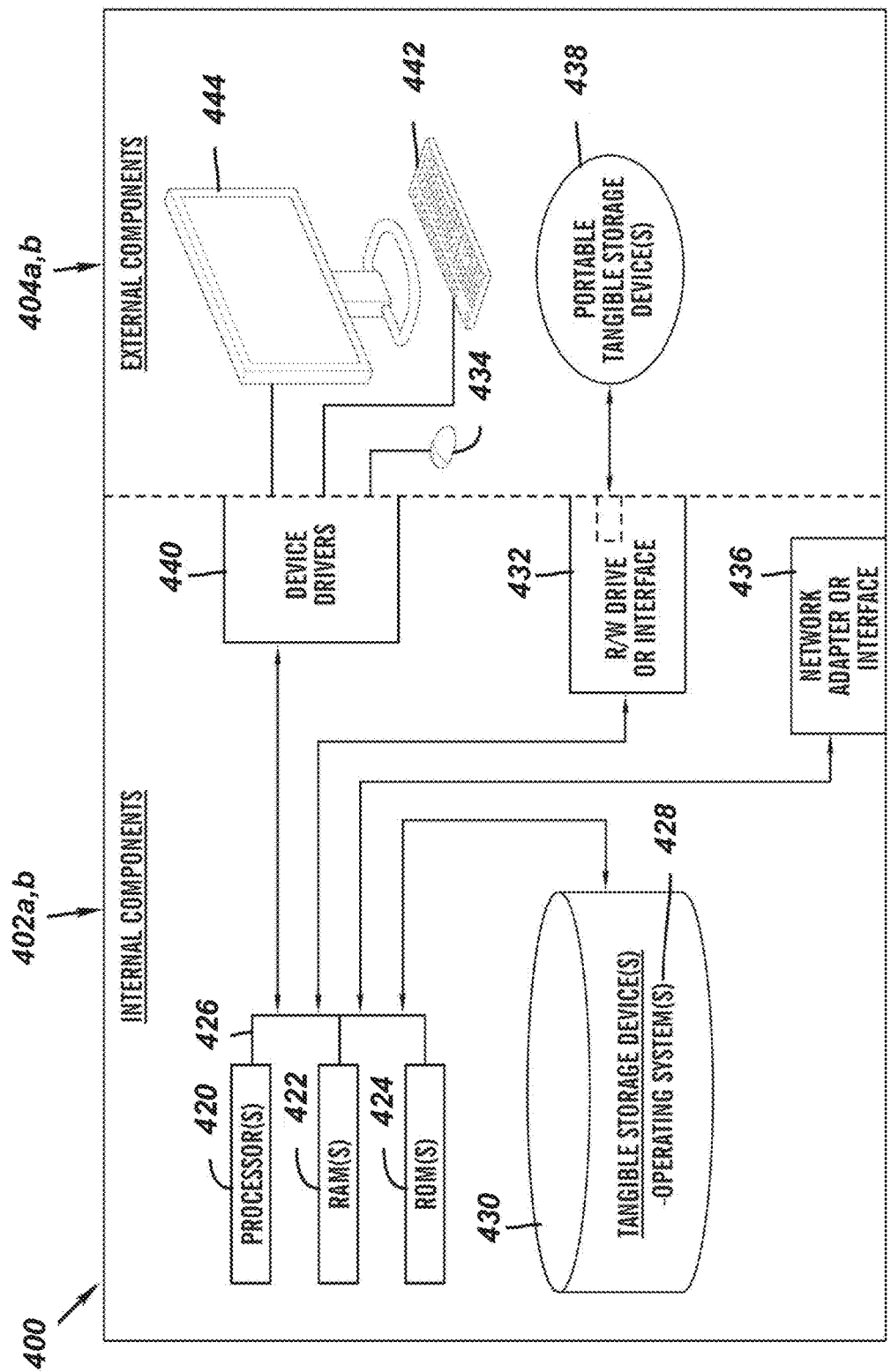
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428 and the recording zone creation program 110A in the client computing device 102, and the recording zone creation program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the recording zone creation program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The recording zone creation program 110A in the client computing device 102 and the recording zone creation program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the recording zone creation program 110A in the client computing device 102 and the recording zone creation program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
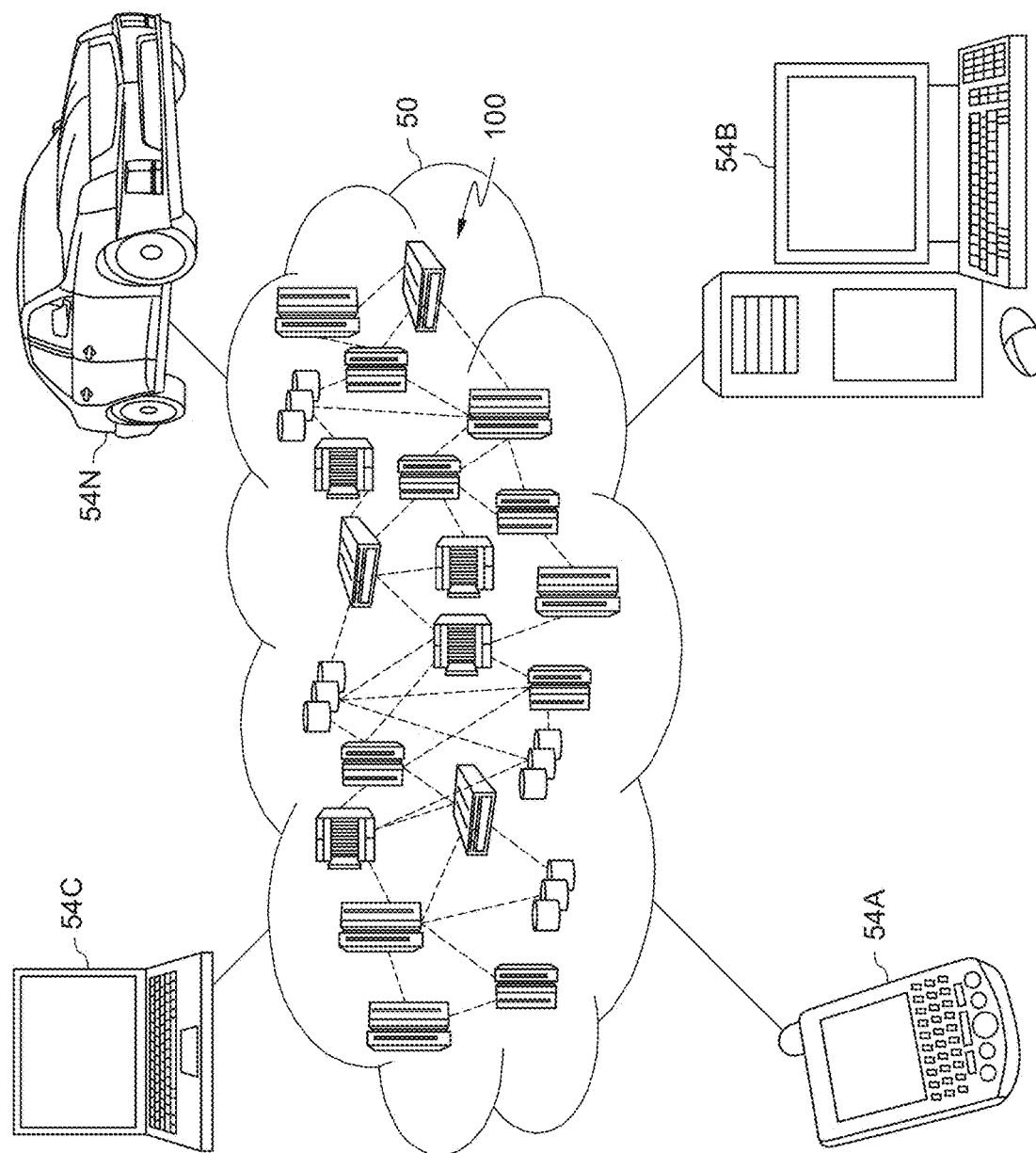
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
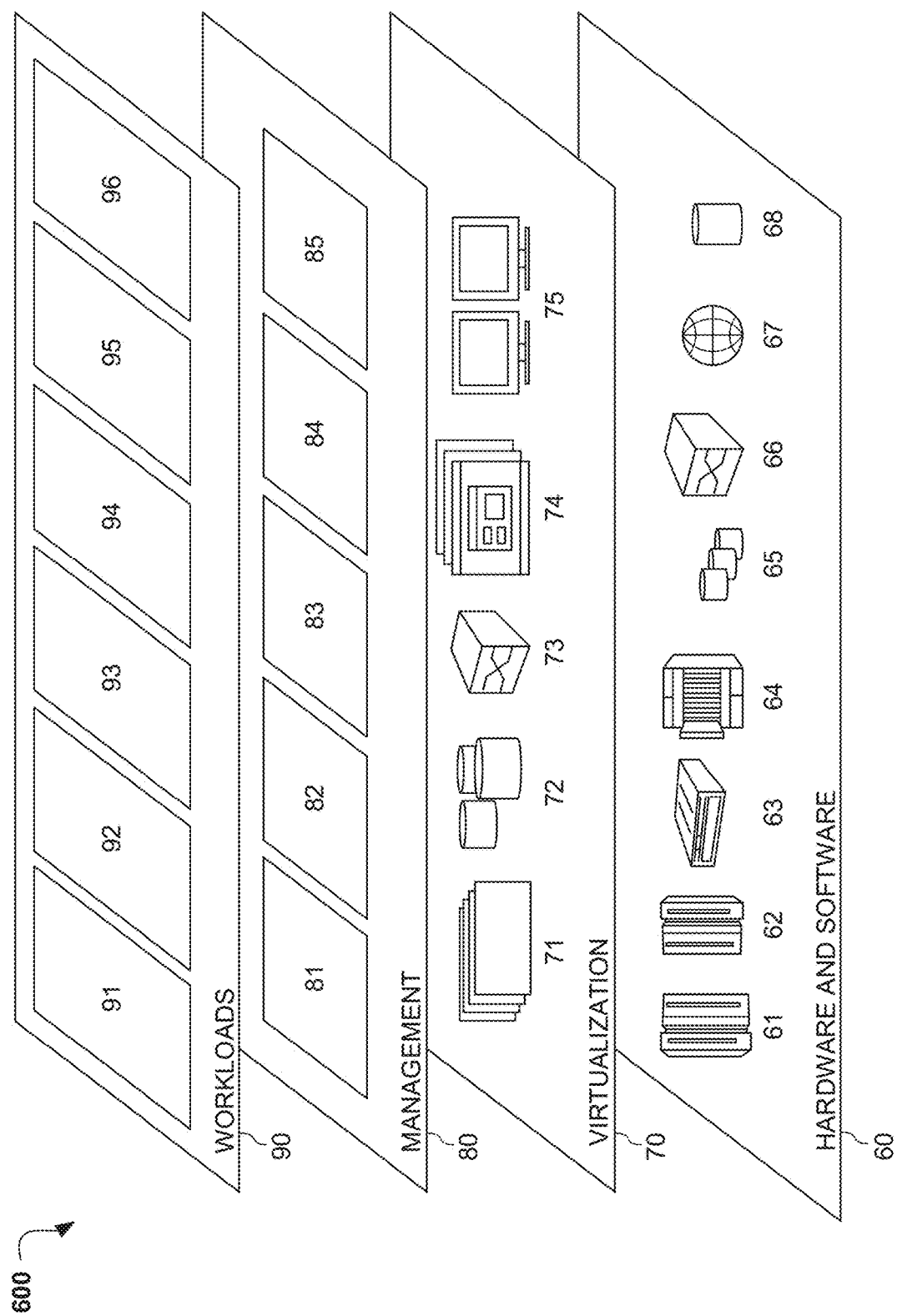
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recording zone creation 96. The recording zone creation 96 may be enabled to automatically identify where video should be paused or recorded to capture an intended subject of a video based on recording zones, and pause or record video accordingly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for operating a camera to perform video capture of a subject, the method comprising:
   toggling between recording and pause states of the camera performing video capture of the subject based on the camera's location within one or more designated recording zones, wherein the recording zones are automatically designated based on one or more interaction behaviors between a user and the camera.

2. The method of claim 1, wherein the recording zones are designated within an augmented reality environment.

3. The method of claim 1, wherein the recording zones are designated by a plurality of users.

4. The method of claim 1, further comprising:
   suggesting a subject to a user based on one or more recording zones designated by the user.

5. The method of claim 4, further comprising:
   responsive to the user accepting a suggested subject, graphically prompting the user to adjust the camera to record the suggested subject.

6. The method of claim 4, further comprising:
   responsive to the user declining the suggested subject, communicating the location of the suggested subject to the user.

7. A computer system for operating a camera to perform video capture of a subject, the computer system comprising:
   one or more processors, one or more cameras, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   toggling between recording and pause states of the camera performing video capture of the subject based on the camera's location within one or more designated recording zones, wherein the recording zones are automatically designated based on one or more interaction behaviors between a user and the camera.

8. The computer system of claim 7, wherein the recording zones are designated within an augmented reality environment.

9. The computer system of claim 7, wherein the recording zones are designated by a plurality of users.

10. The computer system of claim 7, further comprising:
    suggesting a subject to a user based on one or more recording zones designated by the user.

11. The computer system of claim 10, further comprising:
    responsive to the user accepting a suggested subject, graphically prompting the user to adjust the camera to record the suggested subject.

12. The computer system of claim 10, further comprising:
    responsive to the user declining the suggested subject, communicating the location of the suggested subject to the user.

13. A computer program product for operating a camera to perform video capture of a subject, the computer program product comprising:
one or more computer-readable tangible storage medium and program instructions stored on at least one of the one or more tangible storage medium, the program instructions executable by a processor to cause the processor to perform a method comprising:
toggling between recording and pause states of the camera performing video capture of the subject based on the camera's location within one or more designated recording zones, wherein the recording zones are automatically designated based on one or more interaction behaviors between a user and the camera.

14. The computer program product of claim 13, wherein the recording zones are designated within an augmented reality environment.

15. The computer program product of claim 13, wherein the recording zones are designated by a plurality of users.

16. The computer program product of claim 13, further comprising:
suggesting a subject to a user based on one or more recording zones designated by the user.

17. The computer program product of claim 16, further comprising:
responsive to the user accepting a suggested subject, graphically prompting the user to adjust the camera to record the suggested subject.

* * * * *